July 21, 1925.  1,546,495

F. K. LATHROP

HARROW TOOTH CLAMP

Filed Aug. 21, 1924

WITNESSES
David R. Wagner
Philip E. Siggers

F. K. Lathrop INVENTOR

BY E. G. Siggers

ATTORNEY

Patented July 21, 1925.

1,546,495

UNITED STATES PATENT OFFICE.

FRANK K. LATHROP, OF LONGVIEW, TEXAS, ASSIGNOR TO G. A. KELLY PLOW COMPANY, OF LONGVIEW, TEXAS.

HARROW-TOOTH CLAMP.

Application filed August 21, 1924. Serial No. 733,365.

*To all whom it may concern:*

Be it known that I, FRANK K. LATHROP, a citizen of the United States, residing at Longview, in the county of Gregg and State of Texas, have invented a new and useful Harrow-Tooth Clamp, of which the following is a specification.

This invention relates to means for detachably securing harrow teeth to the U-shaped cross bars of a harrow frame.

In toothed harrows, as at present constructed, the teeth have been fastened to the U-shaped cross bars by means of a bolt passing through the clamp and the bar. These bolts become strained, which causes the clamp to loosen its grip on the teeth, resulting in the teeth getting out of adjustment and frequently falling out, with consequent loss.

An object of the invention is to provide an individual clamp for each tooth of a harrow capable of holding the tooth in any desired elevation relative to the frame.

Other objects are to provide an improved clamp which grips the tooth with great firmness and positively prevents movement of the tooth upwardly while permitting withdrawal of the tooth for re-shaping its point.

Additional objects are to provide a device of this character which is easily manufactured, readily applied, and of extreme simplicity in construction.

A specific object of the invention is to provide a holder for harrow teeth having a gripping tongue which is sprung out from the clamp by the driving of the tooth through the clamp.

The device of the present invention employs no bolts, screws or other fastening elements, and thus it is not necessary to punch holes in the frame bars of the harrow.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1:
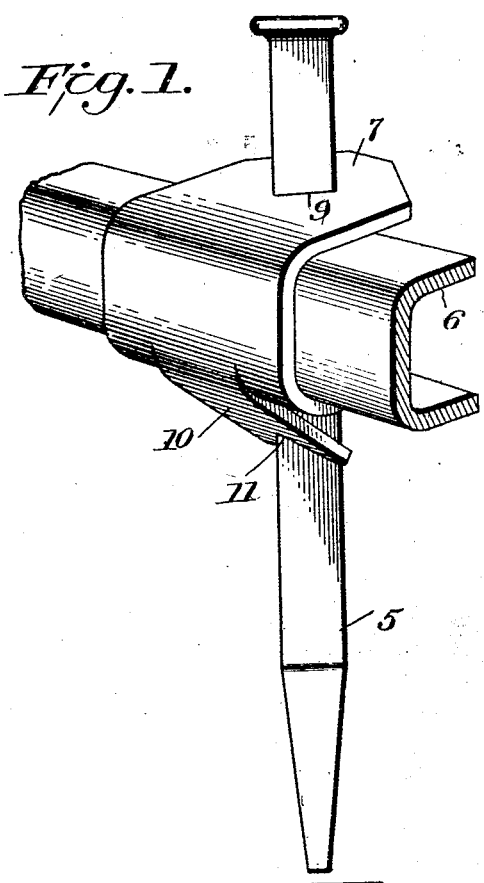
Fig. 1 is a perspective view showing a portion of a cross bar with the improved clamp in place and holding a tooth thereto.
Figure 2:
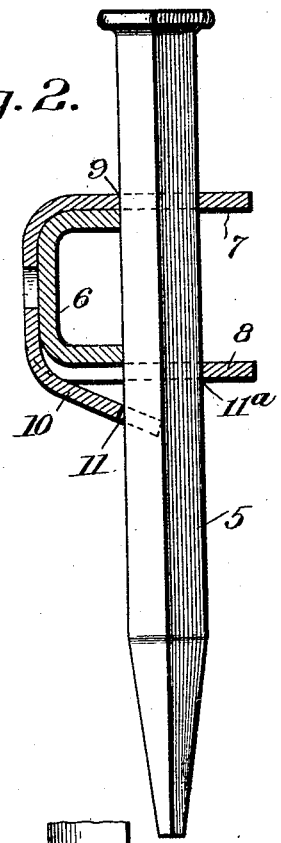
Fig. 2 is a vertical cross section through the bar and clamp showing the tooth in elevation.
Figure 3:
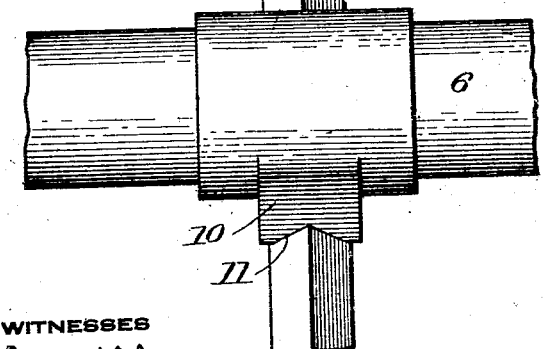
Fig. 3 is a fragmentary elevation.
Figure 4:
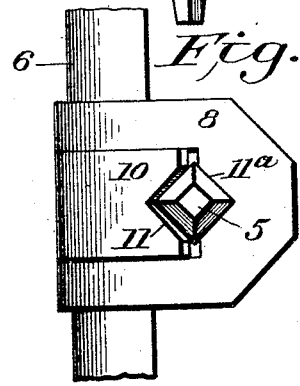
Fig. 4 is a bottom plan view.

The reference numeral 5 denotes the tooth of the harrow, and 6 is the U-shaped cross bar. A clamp, which forms the subject of the present invention, is fitted over the cross bar 6 and itself is U-shaped. This clamp or clip is made of one piece of steel of considerable resiliency and includes the arms 7 and 8, the arm 7 resting upon the upper side of the bar 6 and the arm 8 fitted against the lower side of said bar. A square perforation 9 is provided in the arm 7 for receiving the square shank of the harrow tooth 5. This perforation is so disposed that an edge or corner of the tooth is presented against the edges of the U-shaped bar 6. In other words, none of the flat longitudinal faces of the tooth is held against the bar 6.

The lower arm 8 of the spring clamp or clip has a tongue 10 cut therein, said tongue before the clamp is applied, lying in the plane of the arm 8 ready to be wholly received within said arm. The arm 8 is cut away as indicated at 11ª, the sides of said cutaway portion being at right angles to each other to receive and fit against two longitudinal faces of the tooth 5. The end of the tongue 10 is cut away as indicated at 11 so that the two cutaway portions 11 and 11ª together provide a square perforation in vertical alinement with the perforation 9 when the clamp is in position. The perforation formed of the complemental cutaway sections 11 and 11ª is of slightly smaller dimensions than the perforation 9 and is slightly smaller than the cross sectional area of the tooth 5. The result is that while the tooth may be driven through the perforation 9 without encountering more than frictional resistance, after its point has passed through the perforation 11, 11ª and the square shank of the tooth starts to enter said perforation, the spring tongue 10 is forced outwardly and downwardly from the arm 8 as indicated in the figures of the drawing.

The tendency of the spring tongue 10 is to return to its original position because of the high resiliency of the steel clamp. The notch 11 presses against the shank of the tooth and grips the same very firmly. Any tendency on the part of the tooth to rise is positively prevented because the spring tongue 10 clamps the tooth the more firmly the greater the force tending to move the tooth upwardly. The tongue 10 can never return to its original position as long as the tooth is in the clamp, because of the relative size of the perforation 11, 11ª and of the tooth itself. On the other hand, it is relatively easy to remove the tooth for reshaping the point, or for replacement by a new tooth when desired, such removal being effected by merely driving a wedge between the arm 8 and tongue 10. This will spring the tongue 10, causing it to become disengaged from the tooth, whereupon the latter may be knocked out of the clamp.

The principal features of the present clamp are believed to be its extreme simplicity, its strength, and the ease with which it is applied to and taken off the harrow bar.

What is claimed is:—

1. A harrow tooth fastening including a clamp of resilient metal, said clamp having a pair of alined apertures of a size to pass the harrow tooth, and a tongue punched out from the clamp and engaging with two sides of the tooth to hold the tooth against longitudinal movement.

2. A harrow tooth fastening including a clamp of resilient metal adapted to embrace the harrow bar, said clamp having a pair of spaced vertically alined apertures of a size to pass the harrow tooth, and an integral tongue provided on the clamp and depending below the bottom thereof, whereby the tooth is engaged at spaced points vertically thereof, in part by said tongue and in part by the walls of the aperture in said bottom.

3. A harrow tooth fastening including a clamp of resilient metal adapted to embrace the harrow bar, said clamp having a pair of spaced vertically alined apertures of a size to pass the harrow tooth, and a spring tongue provided on said clamp and engaging the tooth below the lower aperture of said clamp, whereby the tooth is engaged at spaced points vertically thereof.

4. A harrow tooth fastening including a clamp of resilient metal, said clamp having a pair of alined apertures for receiving said tooth, and a tongue punched out from the tooth, and a tongue punched out from the clamp and engaging with two sides of the tooth to hold the tooth against longitudinal movement, the lower aperture being provided in part by the end of the tongue.

5. A harrow tooth fastening including a U-shaped clamp of resilient metal, a pair of alined apertures provided in the arms of said clamp of a size to pass the harrow tooth, said clamp being adapted to embrace the harrow bar on three sides and hold the harrow tooth with one edge abutted against the harrow bar, the holding part of the clamp including a spring tongue provided on the clamp and bent outwardly from the same by the driving of the tooth through the clamp.

6. A harrow tooth fastening comprising a U-shaped clamp of resilient metal, apertures in the arms of said clamp adapted to receive the harrow tooth, a spring tongue provided on the lower side of said clamp and being engaged by the tooth when driven into position, said tooth bending the tongue downwardly from the clamp whereby the tongue engages with the tooth to hold the same against longitudinal movement.

7. A harrow tooth fastening including a clamp of resilient metal, said clamp being adapted to embrace the harrow bar on three sides, vertically alined apertures provided in the arms of said clamp, a tongue provided on the lower arm of the clamp and normally held by its resiliency in coincidence with the plane of said arm, the lower aperture being formed in part by the lower arm and in part by the free end of said tongue and being smaller than the cross section of the tooth whereby the tooth when entering the lower aperture forces the said spring tongue downwardly and outwardly so that it clamps the tooth in position.

In testimony that I claim the foregoing as my own, I have hereto affixed my signature.

FRANK K. LATHROP.